Oct. 28, 1941.                    L. G. BLACK                    2,260,288
                      DRILL FOR PENETRATING HARD METALS
                            Filed Dec. 7, 1940

INVENTOR:
LESTER G. BLACK
BY Morton S. Brockman
        ATTORNEY.

Patented Oct. 28, 1941

2,260,288

UNITED STATES PATENT OFFICE 2,260,288

DRILL FOR PENETRATING HARD METALS

Lester G. Black, Cleveland, Ohio

Application December 7, 1940, Serial No. 369,107

9 Claims. (Cl. 77—67)

This invention relates to bores, and more particularly to drills or penetrating devices used either for perforating or for recessing an extremely hard metal.

As conducive to a clearer understanding of this invention, it may be well to point out that conventional drills cut or chip their way through the work with the result that if the work is extremely hard, the cutting edge of the instrument quickly dulls and requires resharpening. If too much pressure happens to be applied to the tool, the drill breaks or twists out of shape and becomes useless. The conventional cutting drills, and even grinders, require a lubricant or an abrasive to facilitate their efficient operation. Overheating of the drill, which is often caused by too rapid operation, destroys the drills and often ruins the work.

It has been found from experiment that very hard metals, such as stainless steel, which cannot be penetrated by conventional drills may be penetrated with relative ease and economy by the use of the instant invention. The tools described and claimed herein do not have cutting edges or blade portions which engage the work, but instead the edges on the tools are blunt and merely scrape the work. The process which causes the tools to actually penetrate the work, may be more nearly defined as a rapid burnishing process and which process is concentrated over a very small area.

This improved instrument is used without any lubricant or abrasive. It is used dry and the more heat that is created by the friction between the tool and the work, the faster the hole is made. The novel nature of this tool is demonstrated by the fact that the material removed, instead of coming out in the form of conventional chips or shavings, comes out hot in a semi-plastic state and takes the shape when cool of small coiled round wires. Sclerometric tests made of the metal immediately adjacent the hole formed show that the work is slightly softened thereabout which enables the hole to be tapped for screw threads with relative ease. The use of ordinary drills does not change the nature or texture of the work.

One thing, however, must be noted in order to have the instant drill work satisfactorily, and that is, the metal of the instrument must have a higher annealing temperature than the annealing temperature of the work. If this relationship of temperatures is observed, extremely hard steels, such as those having a Brinell hardness number of 700 may be perforated, whereas conventional drills cannot be used effectively on steels testing over 350 Brinell.

It is therefore the primary object of this invention to provide an instrument which will effectively, economically, and efficiently perforate extremely hard metals.

Another object is to provide an instrument which will form a flat bottom hole or which instrument may be used to counterbore another hole.

A further object of the invention is to provide a drill or boring tool of the type mentioned which facilitates the subsequent tapping of the hole for screw threads.

These and other objects and features of the invention will become apparent from a reading of the following description and claims together with the accompanying drawing in which like parts are designated by like reference characters and wherein:

*Preferred form of drill*

Figure 1:
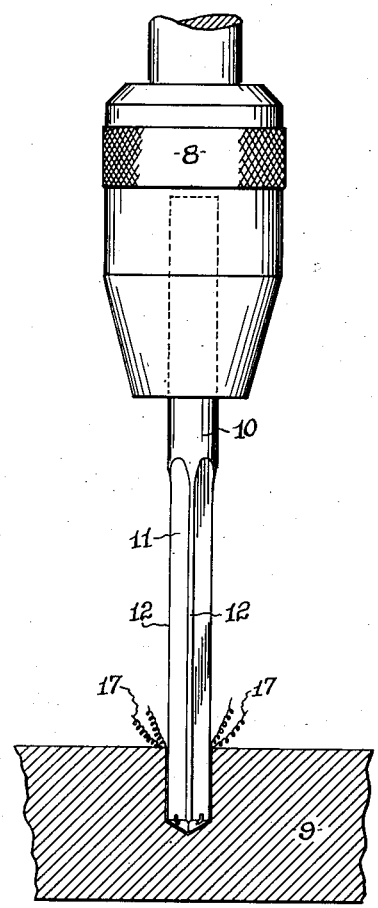
Figure 1 is a comprehensive view of the preferred form of the instrument as it is mounted in a holder or chuck and as it appears during operation.
Figure 2:
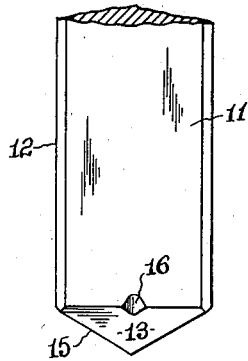
Figure 2 is an enlarged view of an end portion of the drill shown in the Figure 1.
Figure 3:
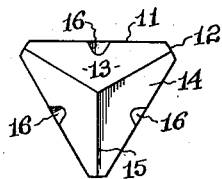
Figure 3 is an end view of the drill shown in the Figure 2.

Referring to the Figures 1, 2, and 3 there is shown the novel drill which is used for completely penetrating a piece of metal. The drill has a shank 10 which fits into a holder or chuck 8 just as an ordinary drill does. It has a body portion which has perfectly straight flat sides 11 and edges 12. The body portion in cross-section is triangular, and the edges neatly conform to the curvature of the wall of the hole being drilled.

The end portion 13 is pyramidal in shape; that is, the three projecting faces or facets 14 converge and taper and meet at a common central point. The adjacent facets meet and form relatively blunt radially extending inclined edges 15. It has been found through experiments that the instrument operates most efficiently when the faces 14 form an angle of approximately 120° with the abutting flat straight sides 11 of the body portion. It has also been found that if small grooves 16 are formed in the body and end portions so that the abutting sides 11 and faces 14 are interconnected, the instrument has a tendency to work easier and faster as the material of the work 9 can escape from the bottom of the hole and is guided upwardly along the sides 11 and out.

First modified form of drill

Figure 4:
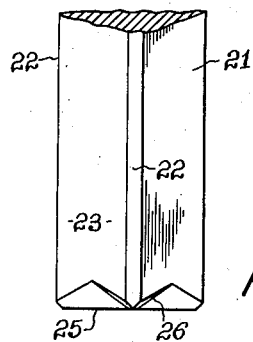
Figure 4 is an enlarged view of a modified form of drill adapted for boring flat-bottom holes.
Figure 5:
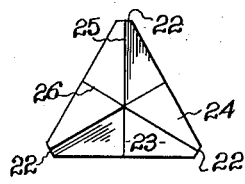
Figure 5 is an end view of the drill shown in Figure 4.

The second style of the invention, the one illustrated in the Figures 4 and 5, is similar to the first form just described in that the shank portions and body portions are identical. It also has a round shank portion and a body portion which has straight flat surfaces 21 and slightly rounded edges 22. Its end portion, however, differs in that the radially extending ridges 25 are at right angles to the edges 22. The facets 24 are recessed instead of being protrusive. There are, consequently, six inclined or beveled facets spaced between the alternating radially extending edges 25 and grooves 26. This particular style is adaptable for drilling flat bottoms, holes, or for counterboring previously drilled holes.

Second modified form of drill

Figure 6:
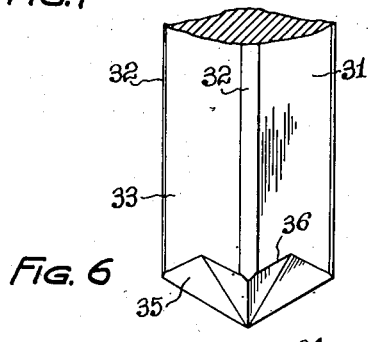
Figure 6 is an enlarged view of a second modified form of drill adapted for facilitating the tapping of the hole for screw threads.
Figure 7:
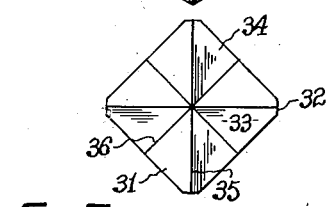
Figure 7 is an end view of the drill shown in the Figure 6.

The second modified form of the drill, illustrated in the Figures 6 and 7 of the drawing, has a body portion which is square in cross-section. It also has flat straight sides 31 and the slightly rounded edges 32.

The end portion 33 has facets 34 which are both recessive and protrusive. This construction specifically embodies four radial ridges 35, which ridges meet at a common central point and extend inwardly and downwardly from the slightly rounded edges 32. Each radial ridge 35 forms with its contiguous longitudinal edge an angle of approximately 120°. The four radial grooves 36, which also meet the four radial ridges 35 at the same central point, extend inwardly from the centers of the longitudinal flat surfaces 31. These grooves 36 form with the adjacent longitudinal surfaces 31 an angle of approximately 135°. The eight facets 34 thus formed between the alternating ridges 35 and grooves 36 enables the tool to be driven at a very rapid rate of speed.

This type of drill, by reason of the fact that it provides more friction on the wall of the hole being drilled, softens the metal 9 more than otherwise and makes it easier to tap the resultant hole for screw threads if desired.

It will now be clear that there is provided by this invention drills for penetrating hard metal which accomplish the objects herein set forth. While the invention has been illustrated and described in certain preferred forms, it is to be understood that there may be other forms or adaptations of the invention. For example, any of the forms of the tool shown may be made with hexagonal or octagonal crosssections instead of the triangular or square cross-sections shown. These modifications are also considered to be within the scope of the invention as no limitations upon it are intended other than those imposed thereon by the breadth of the appended claims.

I claim:

1. A drill of the type described, comprising in combination, a shank portion receivable by a holder, a body portion having a non-circular cross-section integral with the shank portion, and an end portion having a plurality of recessive facets thereon integral with the body portion, the said facets forming frictional contact with the work to be drilled.

2. A drill of the type described, comprising in combination, a shank portion receivable by a holder, a body portion having flat sides and straight edges formed thereby integral with the shank portion, and an end portion integral with the body portion and having ridges extending radially from the straight edges and grooves extending radially from the flat sides forming a plurality of facets thereon.

3. A drill of the type described, comprising in combination, a shank portion receivable by a holder, a body portion having flat sides and straight edges formed thereby integral with the shank portion, and an end portion integral with the body portion and having ridges and grooves alternately extending radially from the sides and edges of the body portion and forming thereby a plurality of facets.

4. A drill of the type defined in claim 3 but further characterized by the ridges forming with the straight edges an angle of 120° and the grooves forming with the flat sides an angle of 135°.

5. A drill of the type described, comprising in combination, a shank portion receivable by a holder, a body portion having a triangular cross-section integral with the shank portion, and an end portion having six recessive facets thereon integral with the body portion, the said facets forming frictional contact with the work to be drilled.

6. A drill of the type described, comprising in combination, a shank portion receivable by a holder, a body portion integral with the shank portion and having a non-circular cross-section, an end portion integral with the body portion and having a plurality of radially extending edges, the said end portion also having a plurality of facets recessed therein and between the said edges.

7. A drill of the type described, comprising in combination, a shank portion receivable by a holder, a body portion integral with the shank portion and having a square cross-section, and an end portion integral with the body portion and having four oblique and radially extending edges thereon, the said end portion also having eight facets recessed therein and between the said edges.

8. A drill of the type described, comprising in combination, a shank portion receivable by a holder; a body portion integral with the shank portion and having a non-circular cross-section and straight sides; and an end portion integral with the body portion and having a number of radial inclined edges thereon, the said end portion also having a number of facets thereon between the said inclined edges and abutting the said straight sides, the number of said facets exceeding the number of said inclined edges, the said inclined edges forming an acute angle with the said cross-section.

9. A drill of the type described, comprising in combination, a shank portion receivable by a holder, a body portion integral with the shank portion and having a square cross-section and straight sides, and an end portion integral with the body portion and having four radial inclined edges thereon, the end portion also having eight facets thereon between the inclined edges and abutting the straight sides, the said inclined edges being at an angle of approximately 45° with the said cross-section.

LESTER G. BLACK.